United States Patent [19]
Hait

[11] Patent Number: 5,535,733
[45] Date of Patent: Jul. 16, 1996

[54] HEAT RADIATOR FOR OUTDOOR COOKING UNIT

[75] Inventor: Paul W. Hait, Sun River, Oreg.

[73] Assignee: Pyromid, Inc., Redmond, Oreg.

[21] Appl. No.: 439,884

[22] Filed: May 12, 1995

[51] Int. Cl.[6] ..................... F24C 1/16
[52] U.S. Cl. ............ 126/59; 126/9 R; 126/9 B; 126/25 R; 126/26; 126/50
[58] Field of Search ............. 126/9 R, 9 B, 126/25 R, 25 B, 29, 26, 50, 59, 58, 9 A

[56] References Cited

U.S. PATENT DOCUMENTS

| | | | |
|---|---|---|---|
| 3,384,066 | 5/1968 | Tufts | 126/9 |
| 3,682,154 | 8/1972 | Mollere | 126/9 R |
| 4,531,505 | 6/1985 | Hait | 126/9 R |
| 4,829,975 | 5/1989 | Hait | 126/9 R |
| 4,877,010 | 10/1989 | Hait | 126/9 A |

*Primary Examiner*—Larry Jones

[57] ABSTRACT

A heat radiator for an outdoor cooking unit having a base. Formed in the upstanding walls of the base are openings for the entry of combustion air. Within the base and seated on the base above the combustion air openings is a fire grate. Above the fire grate and supported by the base is a cover. The cover includes a generally flat, horizontal top plate that is formed with parallel rows and columns of relatively small openings for the flow of hot air from the heat radiator. The openings formed in the top plate are sufficiently large to inhibit the accumulation of foreign material thereon and are sufficiently small to inhibit the rapid burning of fuel elements on the fire grate.

20 Claims, 13 Drawing Sheets

HEAT RADIATOR FOR OUTDOOR COOKING UNIT

BACKGROUND OF THE INVENTION

The present invention relates in general to outdoor cooking units and, more particularly, to a heat radiator for an outdoor cooking unit.

A firebox, generally, was designed for use in a particular type of outdoor cooking unit. Additionally, fireboxes for outdoor cooking units were not efficient in burning off gases emitted from burning briquettes. At times, the outdoor cooking units employing fireboxes were subject to flame flare-up caused by grease or fat dripping from food onto the burning briquettes. Heretofore, outdoor cooking units employing charcoal or briquettes as the fuel had a variable and erratic production of heat for cooking food and, hence, the cooking heat produced therefrom was not always predictable.

In the patent to Hait, No. 4,829,975, issued on May 16, 1989, for Cooking Unit With Improved Fire Grate, there is disclosed a fire grate for supporting briquettes. Formed in the fire grate are slots having generally oval configurations to receive an end section or a side section of the briquettes. The briquettes are supported by the fire grate in upstanding, vertical orientation. The slots are arranged in parallel rows and columns. The patent to Hait also discloses oval openings to receive an end section or a side section of briquettes, while the briquettes are supported for upstanding, vertical orientation.

The patent to Mollere, No. 3,682,154, issued on Aug. 8, 1972, for Portable Disposable Charcoal Grill, discloses a charcoal grill of cardboard lined with aluminum foil on which charcoals are supported.

The patent to Hait, No. 4,877,010, issued on Oct. 31, 1989, for Outdoor Unit With A Disposable Component discloses a foldable support collar for a fire grate having a truncated, pyramidal configuration. Formed in the support collar are openings for the circulation of air to aid in the combustion of fuel.

The patent to Tufts, No. 3,384,066, issued on May 21, 1968, for Charcoal Burners, discloses panels supporting a fire grate on which charcoal fuel elements are disposed. Below the fire grate, the panels are formed with draft air openings.

SUMMARY OF THE INVENTION

A heat radiator for an outdoor cooking unit comprises a base. Seated within the base above the bottom wall of the base is a fuel grate. The fuel grate is formed with openings and the walls surrounding the openings support fuel elements, such as charcoal and briquettes. Seated on the base and extending above and surrounding the fire grate is a generally flat, horizontal top plate. Formed in the top plate of the cover are openings through which hot air escapes for the heating of food and liquid. The openings formed in the top plate of the cover are of a dimension to capture and burn off gases emitted from the fuel elements and to reduce flame flare-up by grease or fat dripping from food onto burning fuel elements by burning off the oxygen in the atmospheric air that may collect under the cover and to produce heat for cooking food at a generally constant temperature over an adequate period of cooking time.

An object of the present invention is to provide a heat radiator for an outdoor cooking unit that lends itself for use in a greater variety of cooking units.

Another object of the present invention is to provide a heat radiator for an outdoor cooking unit with improved efficiency in the burning off of hot gases emitted from burning fuel elements.

Another object of the present invention is to provide a heat radiator for an outdoor cooking unit that reduces flame flare-up caused by grease or fat dripping from food onto burning fuel elements.

Another object of the present invention is to provide an outdoor cooking unit using charcoal and briquettes as fuel in which the heat for cooking food and liquids is at a generally constant temperature over an adequate period of cooking time.

Another object of the present invention is to provide an outdoor cooking unit using charcoal and briquettes as fuel in which the heat produced for cooking food and liquids is generally constant over an extended period of time.

Another object of the present invention is to provide an outdoor cooking unit using charcoal and briquettes in which the cooking heat produced therefrom has greater predictability and has less variations during the cooking time period.

Another object of the present invention is to provide a heat radiator for an outdoor cooking unit that radiates heat in an upwardly direction and that radiates heat in a downwardly direction.

BRIEF DESCRIPTION OF THE DRAWINGS

FIG. 8 is a plan view of the fire grate employed in the heat radiator shown in FIGS. 5 and 6 reduced in size and illustrated with fuel elements supported thereon.

DESCRIPTION OF THE PREFERRED EMBODIMENTS

Figure 1:
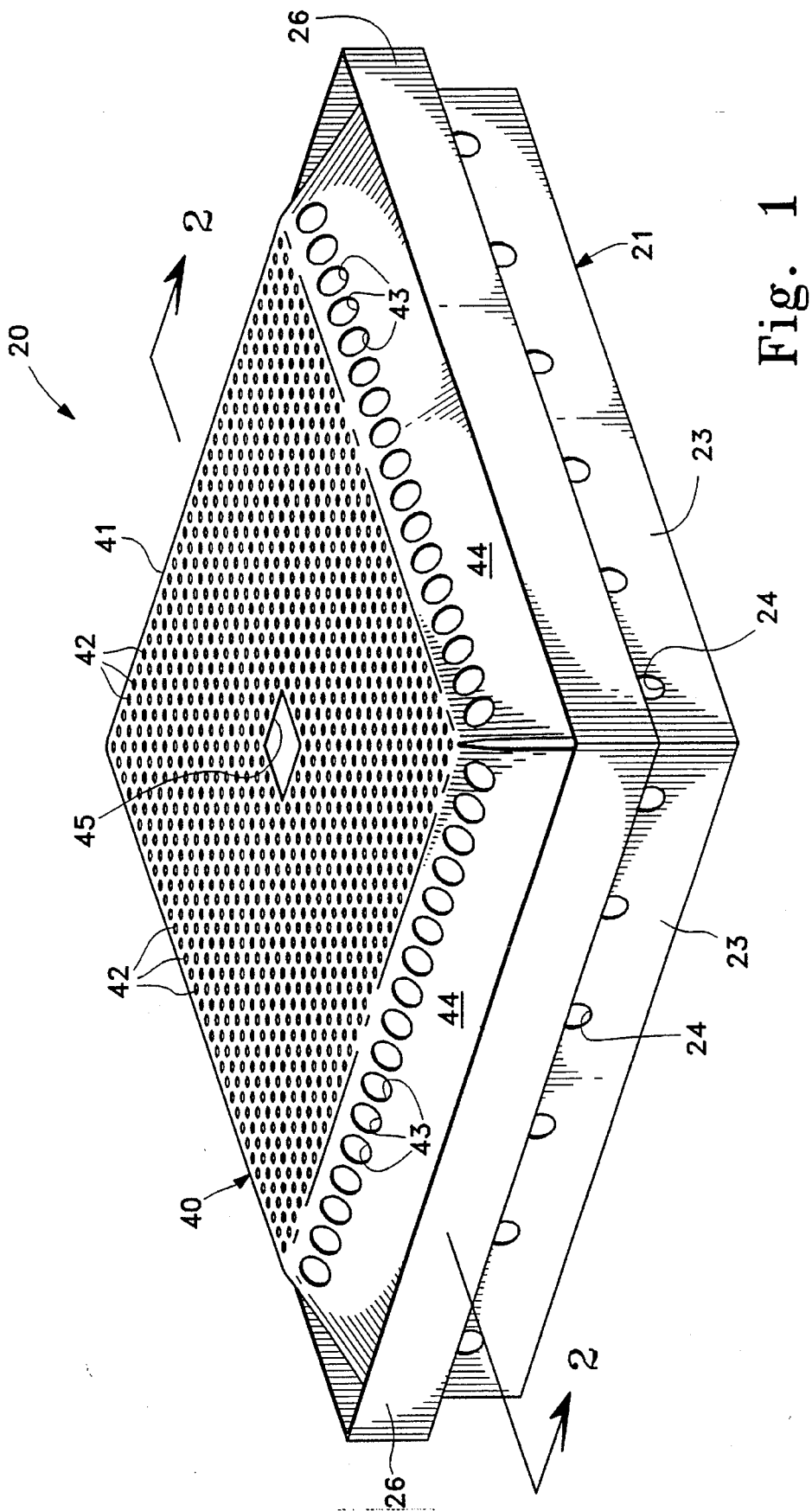
FIG. 1 is a perspective view of a heat radiator for an outdoor cooking unit embodying the present invention.
Figure 2:
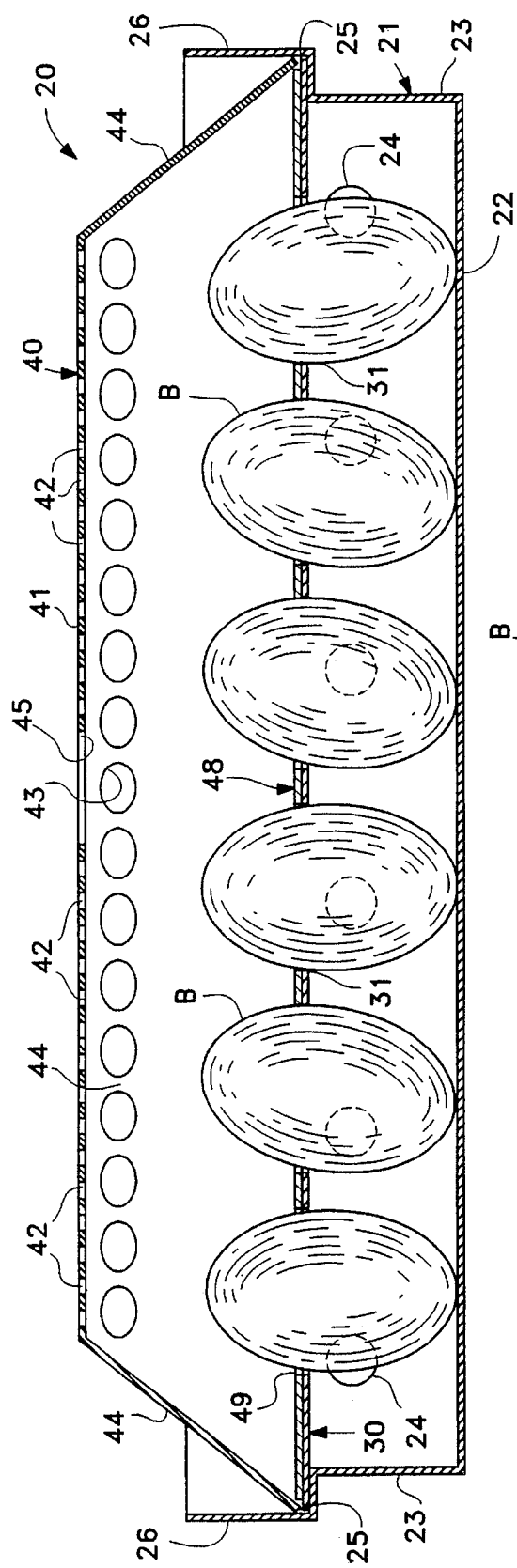
FIG. 2 is a vertical cross-sectional view of the heat radiator shown in FIG. 1 taken along line 2—2 of FIG. 1.
Figure 4:
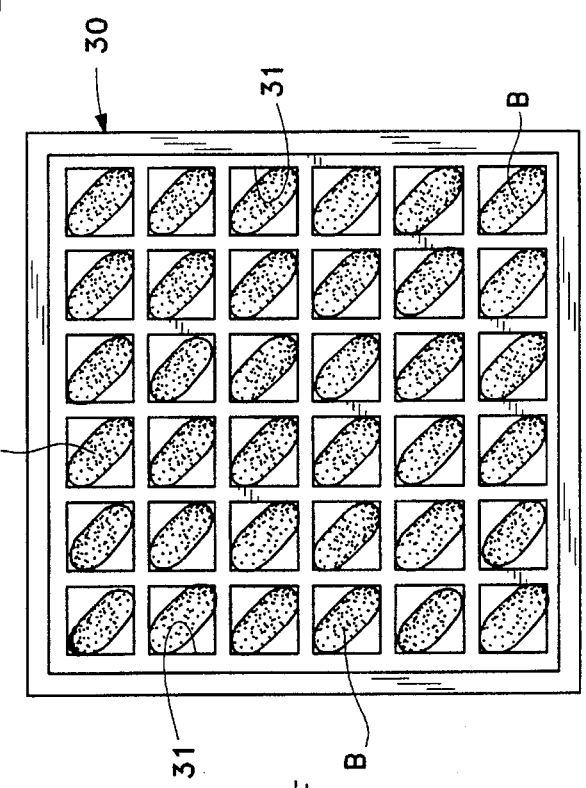
FIG. 4 is a plan view of a fire grate employed in the heat radiator shown in FIGS. 1–3 reduced in size.
Figure 3:
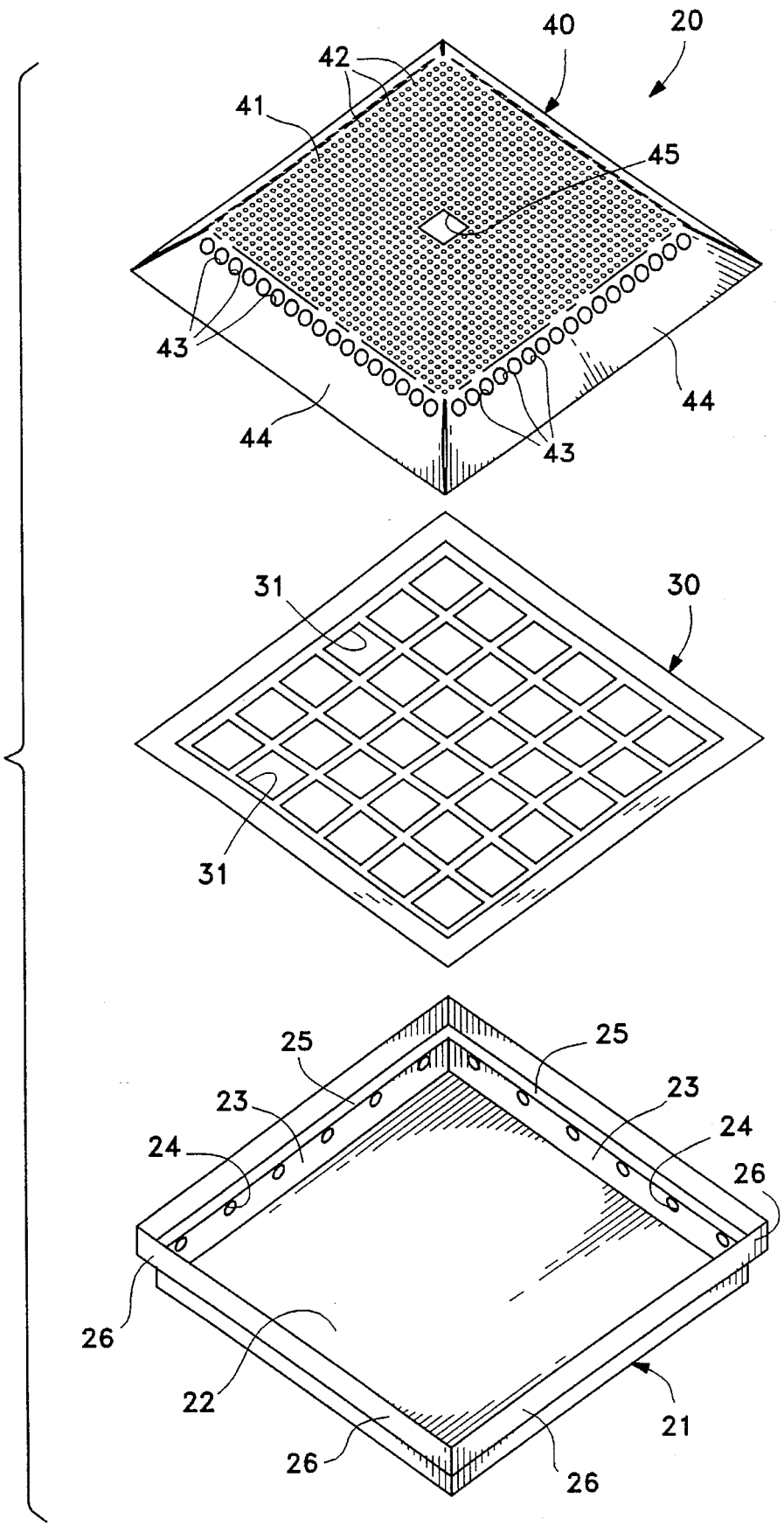
FIG. 3 is an exploded view of the heat radiator shown in FIGS. 1 and 2 with the parts thereof shown reduced in size.

Illustrated in FIGS. 1–3 is a heat radiator 20 for an outdoor cooking unit, which heat radiator embodies the present invention. The heat radiator 20 comprises a base 21 that is adapted for radiating heat in an upwardly direction for an outdoor cooking unit, for radiating heat in a downwardly direction for an outdoor cooking unit and for radiating heat both in the upwardly direction and in the downwardly direction for an outdoor cooking unit.

In the exemplary embodiment, the base 21 is made of suitable material, such as iron or stainless steel. The bottom wall 22 of the base 21, in the exemplary embodiment, has a square configuration with upright walls 23 extending along the perimeter of the bottom wall 22. Formed in the upstanding walls 23 are suitable combustion air openings 24 for atmospheric air to enter the base 21. The walls 23 of the base 21 are formed with shoulders or flanges 25. Extending from the flanges 25 are upright walls 26 of the base 21.

Disposed within the base 21 and seated on the flange 25 of the base 21 is a fire grate 30. The fire grate 30 is made of suitable material, such as iron and stainless steel. It is apparent that the fire grate 30 with depending walls may be dimensioned to seat on the bottom wall of the base 21 so that fire grates of different dimensions may be employed.

In the exemplary embodiment, the fire grate 30 is formed with square-shaped openings 31 configured to receive the narrowed dimensional sections of fuel elements, such as charcoal and briquettes B. The openings 31 are disposed in parallel rows and columns. The walls surrounding the openings 31 support the briquettes B, respectively, in vertical orientation with the narrowed dimensional sections of the briquettes B extending upwardly. The openings 31 receive an end section or a side section of the briquettes B, respectively. Combustion air, which enters the base 20 through the combustion air openings 24, flows through the openings 31 for exposing the briquettes B to the combustion air. The patent to Hait, No. 4,829,975, issued on May 16, 1989, for Cooking Unit With Improved Fire Grate, discloses a fire grate with slots to receive the narrowed dimensional sections of the briquettes. The square-shape openings 31 are configured to enable briquettes B of preselected sizes and configurations to be accommodated therein. It is apparent that oval-shaped slotted openings, as disclosed in the patent to Hait, No. 4,829,975, may be employed to accommodate briquettes of various dimensions and sizes.

A combustible cardboard briquette holder 48 enables the briquettes B to be placed initially on the cardboard holder 48 within respective openings 49. The cardboard holder 48 with the briquettes B thereon is subsequently disposed on the fire grate 30. In this manner, the briquettes B are disposed simultaneously on the fire grate 30 in alignment with the openings 31 of the fire grate 30. The cardboard briquette holder 48 is formed with the openings 49 disposed in parallel columns and rows. The openings 49, when the combustible cardboard briquette holder 48 is disposed on the fire grate 30, are disposed in registry with the openings 31 of the fire grate 30. The cardboard briquette holder 48 is shown only in FIG. 2, since it is combustible.

Disposed above the fire grate 30 and seated on the flanges 24 of the base 21 outboard of the fire grate 30 is a generally flat, horizontal cover 40. In the preferred embodiment, the cover 40 is made of suitable material, such as highly tempered, stainless steel, iron or titanium. The cover 40 comprises a flat, horizontal top plate 41. In the exemplary embodiment, the top plate 41 is formed with openings 42 disposed in parallel rows and columns. The dimensions of the openings 42 should be large enough so as not to fill-up with grease and should be small enough to inhibit too rapid burning of the briquettes B. In the preferred embodiment, each of the openings 42 has a relatively small diameter, i.e. in the range between 3/16th of an inch and 1/4th of an inch.

Depending from the top plate 41 are walls 44 that project downwardly and outwardly from the top plate 41. The free ends of the depending walls 44 seat on the flanges 24 of the base 21 outboard of the fire grate 30. Formed in the depending walls 44 of the cover 40 adjacent the top plate 41 are suitable openings 43 which are respectively greater in diameter than the respective openings 42. Each opening 43 is approximately 3/8th of an inch. Hot air for the heating of food and liquids escapes through the openings 42 and 43 of the cover 40. The openings 43 are employed when the top plate 41 is used as a hot plate and a vent for hot air to escape is desirable. When the top plate 41 is used as a hot plate, the cooking utensils cover the entire top plate 41. However, when the top plate 41 is not serving as a hot plate and the top plate 41 is not covered over entirely or the cooking utensil is spaced above the top plate 41, then the cover 40 may not be formed with the openings 43 to reduce heat loss. The cover 40 is sufficiently rigid and strong to support cooking utensils and other components of an outdoor cooking unit.

The heat radiator 20 is constructed and arranged to control the rate of combustion of the briquettes B, when the top plate 41 is not covered over entirely by a cooking utensil or the cooking utensil is spaced above the top plate 41. Combustion air enters the base 21 of the heat radiator 20 through the combustion air openings 24 formed in the upstanding walls 23 of the base 21. This action causes the outer rows and columns of the briquettes B on the fire grate 30 to initially burn more readily than the inner rows and columns of the briquettes B on the fire grate 30. Initially, the inner rows and columns of the briquettes B on the fire grate 30 are cooler than the outer rows and columns of the briquettes B. As the outer rows and columns of the briquettes B burn down, more combustion air reaches the inner rows and columns of briquettes B. Thus, the inner rows and columns of briquettes B are delayed in the burning process, but after the delay period has expired, all the rows and columns of the briquettes B will reach the same heat producing capacity By virtue of this arrangement, the heat generated by the heat radiator 20 is generally constant over an extended and adequate cooking time period. The heat so generated for cooking has greater predictability and less variations during the cooking time period.

The size of the openings 42 formed in the top plate 41 of the cover 40, when the top plate 41 is not covered over entirely by a cooking utensil or the cooking utensil is spaced above the top plate 41, enables the more efficient burn off of hot gases emitted from the burning briquettes B. The openings 42 of the top plate 41 are of a dimension to partially trap or capture gas emitted from the briquettes B. The openings 42 of the top plate 41 of the cover 40 are dimensioned to impede the flow of gases emitted from the burning briquettes B from rising through the cover 40. While the briquettes B are burning, the top plate 41 becomes heated and burns off the captured gas below the top plate 41.

The cover 40, when the top plate 41 is not covered over entirely by a cooking utensil or the cooking utensil is spaced above the top plate 41, reduces flame flare-up caused by grease or fat from the food dripping onto the burning briquettes B. By virtue of the dimension of each of the openings 42 formed in the top plate 41 and the arrangement of the openings 42 formed in the top plate 41, the oxygen of the atmospheric air within the cover 40 burns off efficiently. The grease or fat from the food dripping onto the briquettes B requires the oxygen of the atmospheric air in order to burn. The efficient consumption of the oxygen of the atmospheric air within the cover 40 reduces flare-up of grease or fat from food dripping onto the burning briquettes B.

The base 21 is waterproof to enable the accumulation of water to facilitate the extinguishing of burning briquettes B. By having an enclosed base 21, the briquettes B absorb the water for extinguishing the burning briquettes B. In the exemplary embodiment, the combustion air openings 24 are approximately 2½ inches above the bottom wall 22 so that a sufficient quantity of water can be accumulated for extinguishing the briquettes B.

To ignite the briquettes B, conventional and well-known methods are employed. For example, solid fuel tablets, solid fuel sticks, alcohol gel, liquid lighter or the like are placed on the briquettes supported by the fire grate 30 before the cover 40 is placed on the base 21. After the cover 40 is disposed on the base 21, matches or the like are dropped through an opening 45 formed in the top plate 41 of the cover 40. In the exemplary embodiment, the opening 45 is one square inch.

Figure 5:
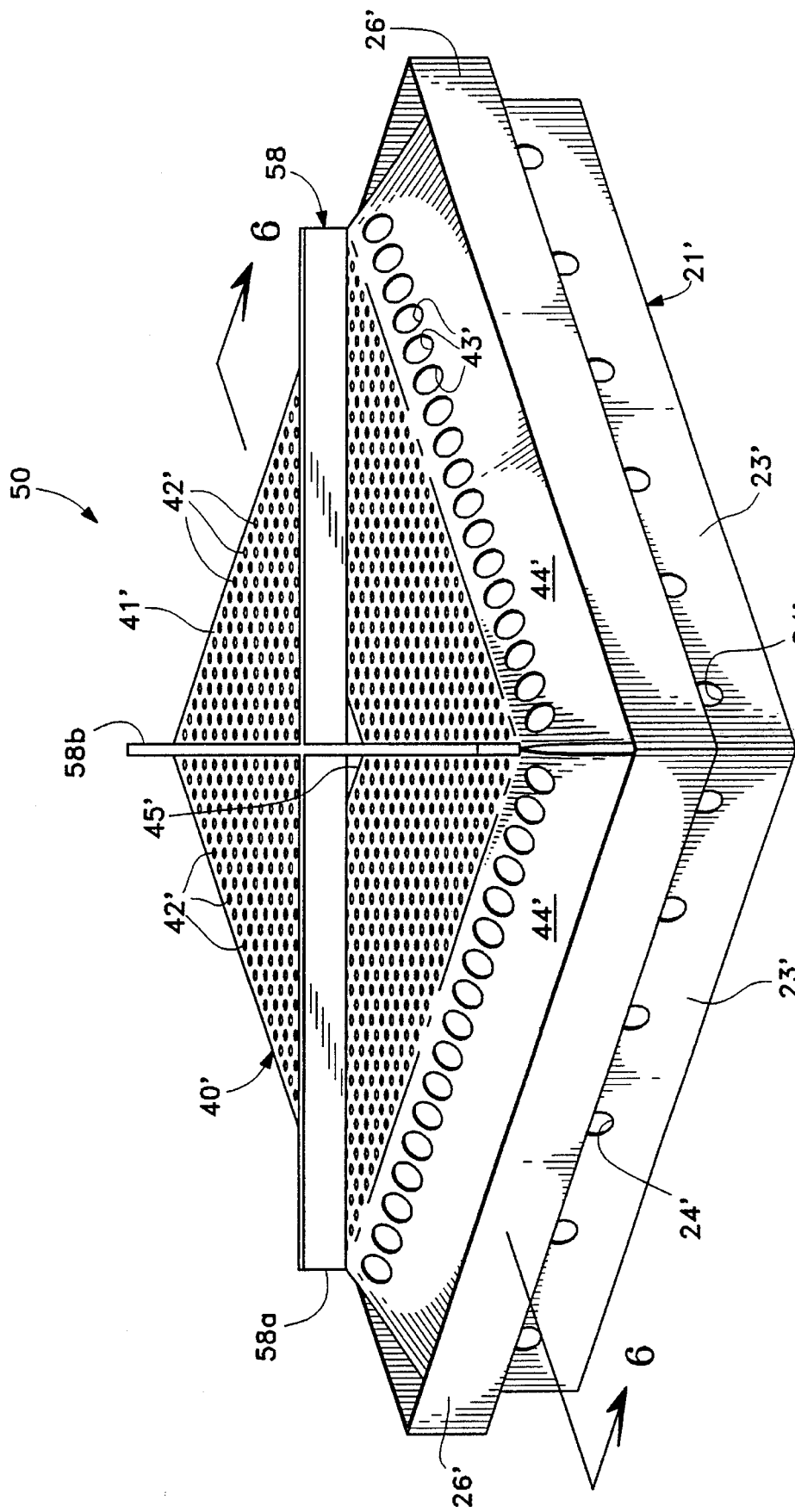
FIG. 5 is a perspective view of a modification of the heat radiator shown in FIGS. 1–4 employing a fuel alignment and combustion air circulation plate for aligning fuel elements supported by a fuel grate and for improved combustion air circulation about the fuel elements.
Figure 6:
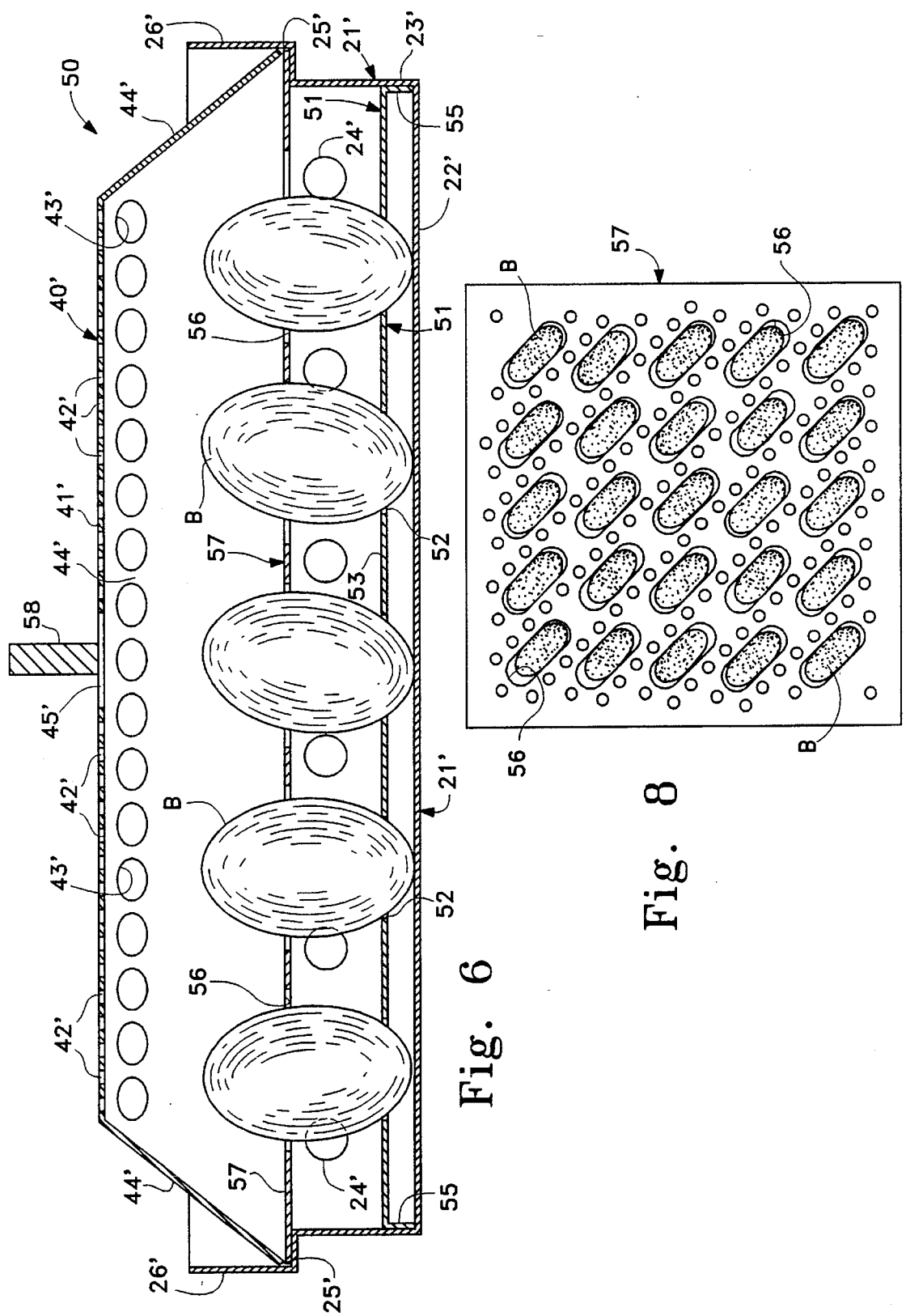
FIG. 6 is a vertical cross-sectional view of the heat radiator shown in FIG. 5 taken along line 6—6 of FIG. 5.
Figure 7:
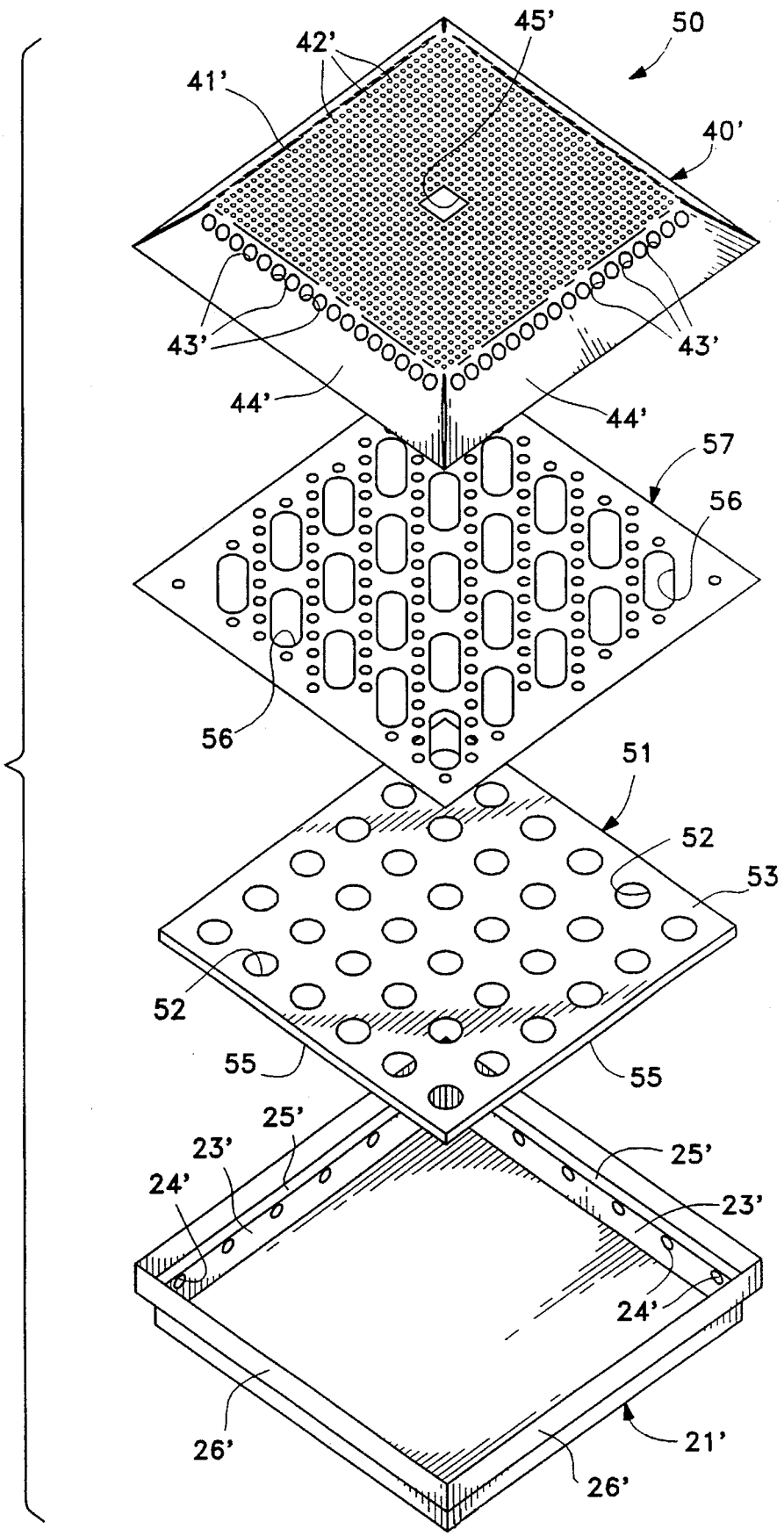
FIG. 7 is an exploded view of the heat radiator shown in FIGS. 5 and 6 with the parts thereof shown reduced in size.

Illustrated in FIGS. 5–7 is a heat radiator 50 that is a modification of the heat radiator 20 shown in FIGS. 1–3. Parts of the heat radiator 50 that are similar in structure and operation to the parts of the heat radiator 20 are shown with the same reference numeral, but with a prime suffix.

The heat radiator 50 differs, in part, from the heat radiator 20 in that a fuel element alignment and combustion air circulation plate 51 is disposed within the base 21' below a fire grate 57. In the exemplary embodiment, the fuel element alignment and combustion air circulation plate 51 is made of suitable material, such as iron or stainless steel. A top wall 53 of the fuel element alignment and combustion air circulation plate 51 is disposed above the bottom wall 22' of the base 21'. The fuel element alignment and combustion air circulation plate 51 seats on the bottom wall 22' of the base 21' through depending walls 55 disposed along the perimeter of the top wall 53. Formed in the fuel element alignment and combustion air circulation plate 51 are fuel element receiving openings 52 arranged in parallel rows and columns. The openings 52 of the fuel element alignment and combustion air circulation plate 51 are disposed below fuel element receiving openings 56 of the fire grate 57. In the exemplary embodiment, each opening 52 in the alignment and combustion air circulation plate 51 has a diameter in the range of ⅝th of an inch to ¾th of an inch. By virtue of the fuel element alignment and combustion air circulation plate 51, a more rapid, high heat is provided for the burning of the briquettes.

There is a tendency for burned briquettes B to become dislodged in the openings 56 of the fire grate 57 and to fall through the openings 56 of the fire grate 57. The walls surrounding the openings 52 of the fuel alignment and combustion air circulation plate 53 tend to hold the briquettes B in position to allow air to circulate around the briquettes B and to circulate upwardly through the cover 40' for improved combustion and to increase the temperature of the cooking heat.

The fire grate 57 is made of suitable material, such as iron or stainless steel and is formed with the parallel slotted openings 56 which receive fuel elements, such as briquettes. The slotted openings 56 are configured to receive the narrowed dimensional sections of briquettes. The walls surrounding the slotted openings 56 support the briquettes in vertical orientation with the narrowed dimensional sections of the briquettes extending upwardly. The slotted openings 56 receive an end section or a side section of the briquettes. The patent to Hait, No. 4,829,975, issued on May 16, 1989, for Cooking Unit With Improved Fire Grate, discloses a fire grate with slotted openings to receive the narrowed dimensional sections of the briquettes. In the preferred embodiment, slotted openings are employed since they accommodate briquettes of various dimensions and sizes.

It is to be understood that the fire grate 57 and the fuel element alignment and combustion air circulation plate 51 may be employed separately or may be employed at the same time as shown in FIGS. 6 and 7.

Seated on the top plate 41' of the cover 40' is a removable windbreaker 58. The windbreaker 58 comprises upright members 58a and 58b that intersect in the center of the top plate 41' and extend to opposite corners of the top plate 41'. The windbreaker 58 is made of suitable material, such as iron or stainless steel. The windbreaker 58 is not employed when the top plate 41' is used as a hot plate and a cooking utensil is disposed in engagement with the top plate 41. The windbreaker 58 may be employed when a cooking utensil is supported above and spaced from the top plate 41'. Hence windbreaker 58 is illustrated only in FIGS. 5 and 6.

Illustrated in FIGS. 9–13 is a heat radiator 70 that is a modification of the heat radiator shown in FIGS. 1–3. The heat radiator 70 comprises a base 71 made of suitable material, such as stainless steel or iron. The base 71 has a bottom wall 72. In the exemplary embodiment, the bottom wall 72 has a quadrilateral configuration. The base 71 also includes upstanding walls 73 disposed along the perimeter of the bottom wall 72. A hook 74 is welded to one of the upstanding walls 73 to be gripped by a suitable handle.

Figure 9:
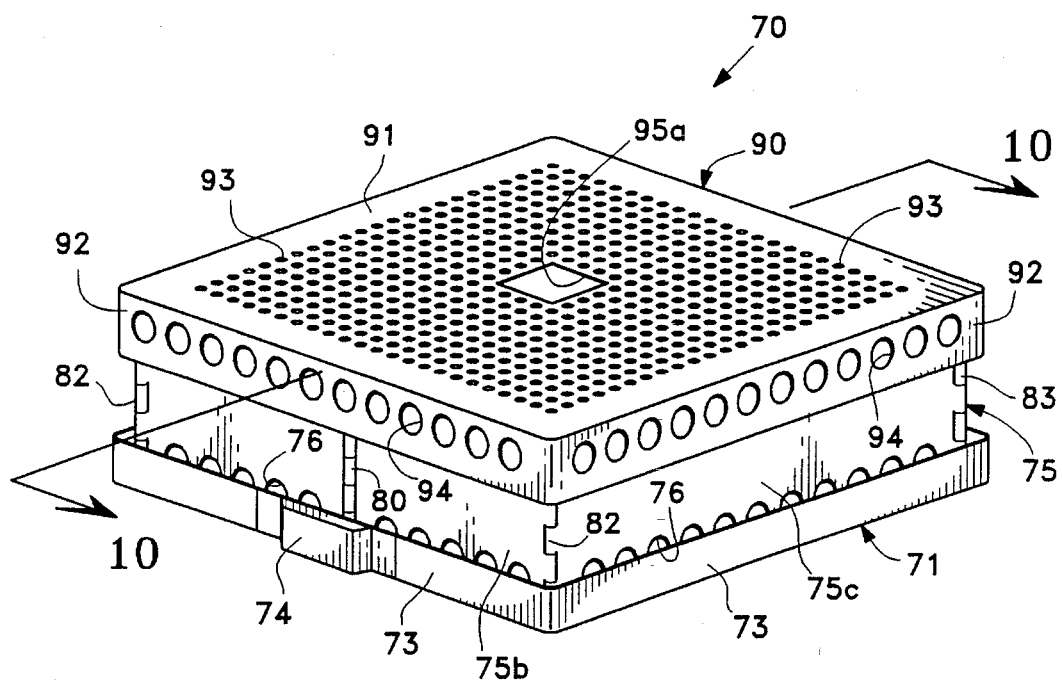
FIG. 9 is a perspective view of a further modification of the heat radiator shown in FIGS. 1–3 illustrated in the mode for cooking food.
Figure 10:
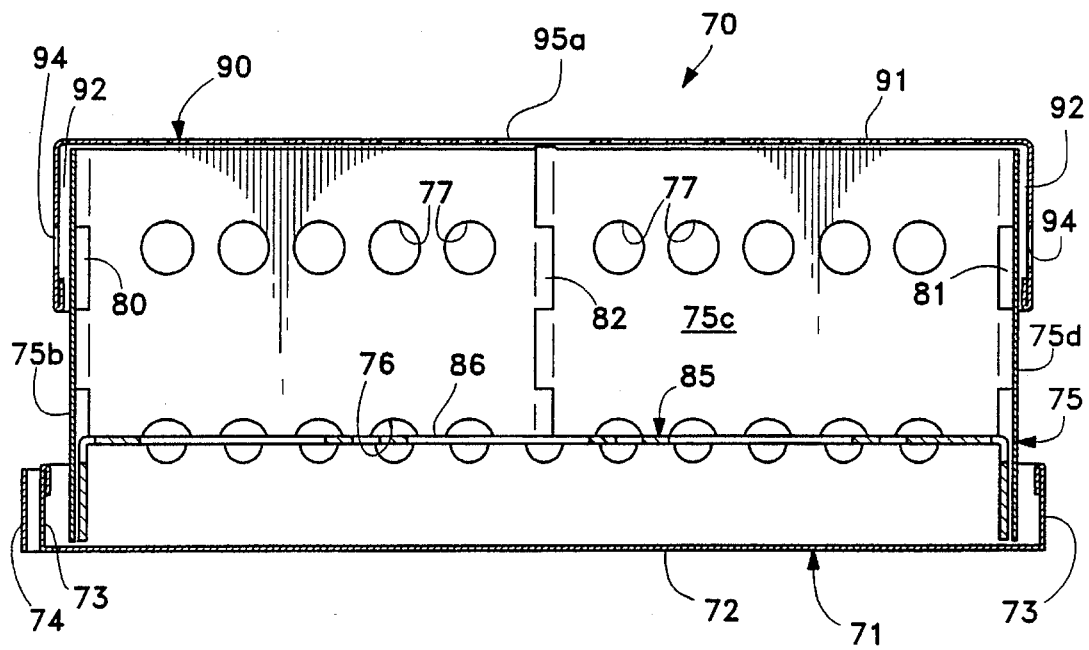
FIG. 10 is a vertical cross-sectional view of the heat radiator shown in FIG. 9 taken along line 10—10 of FIG. 9.
Figure 11:
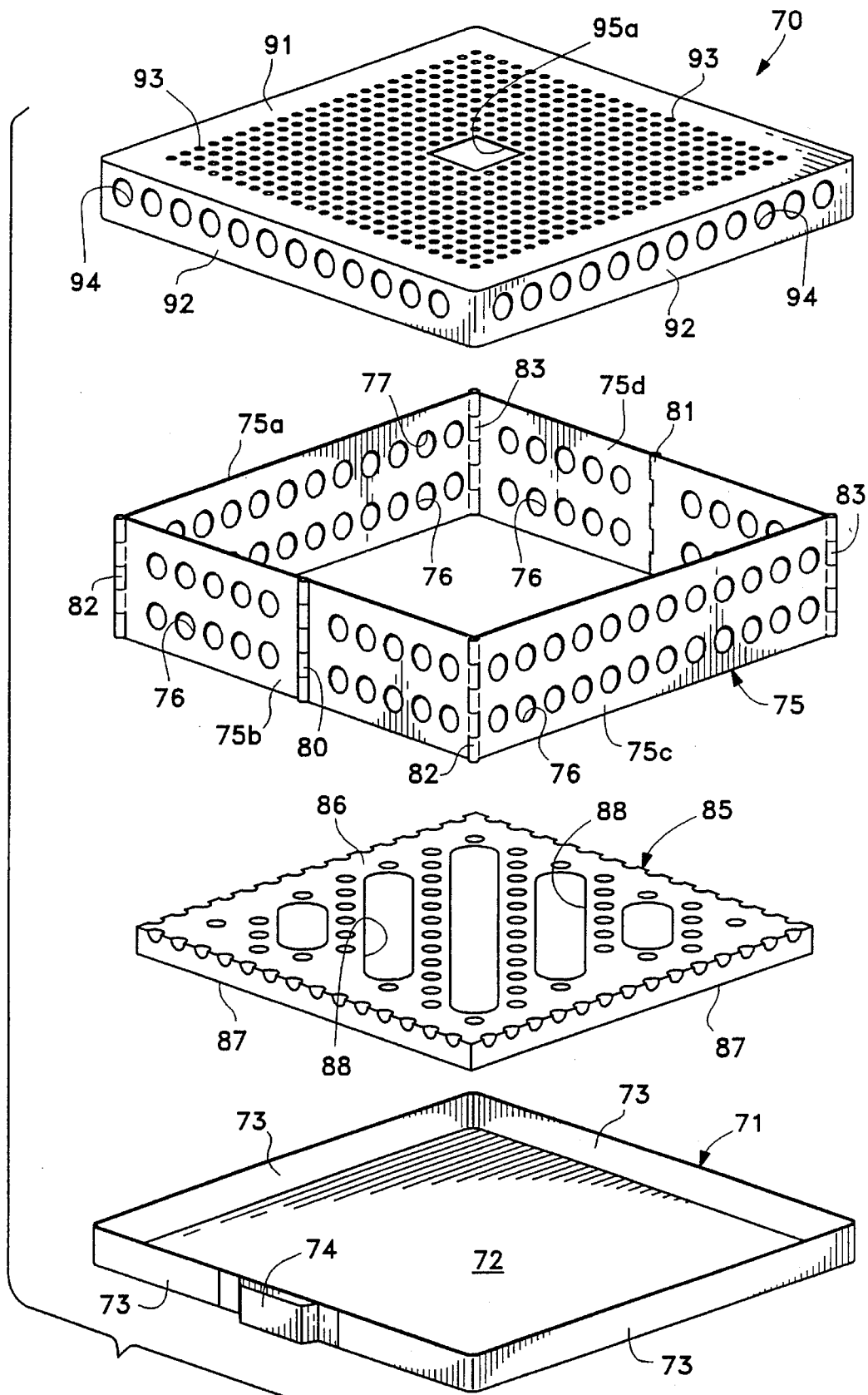
FIG. 11 is an exploded view of the heat radiator shown in FIGS. 9 and 10.

When the heat radiator 70 is in the mode for cooking food, a foldable support collar 75 is in an extended state and is seated on the bottom wall 72 of the base 71 surrounded by the upstanding walls 73 of the base 71 (FIGS. 9 and 10). The foldable support collar 75 comprises upstanding panels 75a–75d. Formed in the upstanding panels 75a–75d are lower openings 76 for combustion air to enter the heat radiator 70 and upper openings 77, for the escape of hot air to heat food and liquids. The use of the upper openings 77 will be described hereinafter. The lower openings 76 are equal distance above the bottom wall 72 and above the upstanding walls 73 of the base 71. Also, the upper openings 77 are equal distance above the bottom wall 72. The foldable support collar 75, when in the extended state for the cooking mode, has, in the exemplary embodiment, a quadrilateral configuration and is made of suitable material, such as stainless steel and iron.

For folding the support collar 75 so that the heat radiator 70 can be arranged in a compact mode (FIGS. 12 and 13) for transport and storage, the opposite foldable panels 75b and 75d are hinged midway between the respective ends by suitable hinges 80 and 81, respectively. The ends of the foldable panels 75b are hinged to the adjacent ends of the confronting panels 75a and 75c, respectively, by suitable hinges 82. Likewise, the ends of the foldable panel 75d are hinged to the adjacent ends of the confronting panels 75a and 75c, respectively, by suitable hinges 83. In this manner, the foldable panels 75b and 75d are folded between the confronting, outboard panels 75a and 75c. The folded panels 75b and 75d confront one another in substantial alignment intermediate the confronting, outboard panels 75a and 75c (FIG. 13).

When the heat radiator 70 is in the extended state for cooking food, a fire grate 85 is seated on the bottom wall 72 of the base 71. The fire grate 85 has a top wall 86. Depending from the top wall 86 of the fire grate 85 along the perimeter thereof are walls 87. The depending walls 87 of the fire grate 85 rest on the bottom wall 72 of the base 71 so that the top wall 86 of the fire grate 85 is spaced above the bottom wall 72. The fire grate 85 is made of suitable material, such as stainless steel or iron.

The fire grate 85 is formed with parallel, slotted openings 88 which receive fuel elements, such as briquettes. The slotted openings 88 are configured to receive the narrowed dimensional sections of briquettes. The walls surrounding the slotted openings 88 support the briquettes in vertical orientation with the narrowed dimensional sections of the briquettes extending upwardly. The slotted openings 88 receive an end section or a side section of the briquettes.

When the heat radiator 70 is in the extended state for cooking food, a generally flat, horizontal cover 90 seats on the extended, foldable support collar 75. The cover 90 includes a top plate 91 and depending walls 92. The depending walls 92 surround the extended foldable support collar 75. The cover 90 is made of suitable material, such as highly tempered stainless steel, iron, or titanium. In the exemplary embodiment, the cover 90 has a quadrilateral configuration.

In the exemplary embodiment, the top plate 91 is formed with openings 93 disposed in parallel rows and columns. The dimensions of the openings 93 should be large enough so as not to fill-up with grease and should be small enough to inhibit too rapid burning of the briquettes B. In the preferred embodiment, each of the openings 93 has a relatively small diameter, i.e. the range of ³⁄₁₆th of an inch and ¼th of an inch. Formed in the depending walls 92 of the cover 90 adjacent the top plate 91 are suitable openings 94 which, respectively, are greater in diameter than the respective openings 93. Each opening 94 is approximately ⅜th of an inch. The openings 94 formed in the depending walls 92 of the cover 90 are in register with the upper openings 77 formed in the panels 75a–75d of the support collar 75. Hot air for heating food and liquids escapes through the openings 93 and 94 of the cover 90. The openings 77 and 94 are used when the top plate 91 is used as a hot plate and a vent for hot air to escape is desirable. When the top plate 91 is used as a hot plate, the cooking utensils cover the entire top plate 91. However, when the top plate 91 is not serving as a hot plate and the top plate 91 is not covered over entirely or the cooking utensil is spaced above the top plate 91, then the cover 90 is not formed with the openings 93 and the collar 75 may not be formed with the openings 77. The cover 90 is sufficiently rigid and strong to support cooking utensils and other components of an outdoor cooking unit.

The heat radiator 70 is constructed and arranged to control the rate of combustion of the briquettes B, when the top plate 91 is not covered over entirely by a cooking utensil or the cooking utensil is spaced above the top plate 91. Combustion air enters the support collar 75 of the heat radiator 70 through the combustion air openings 76 formed in panels 75a–75d. This action causes the outer rows and columns of the briquettes B on the fire grate 85 to initially burn more readily than the inner rows and columns of the briquettes B on the fire grate 85. Initially, the inner rows and columns of the briquettes B on the fire grate 85 are cooler than the outer rows and columns of the briquettes B. As the outer rows and columns of the briquettes B burn down, more combustion air reaches the inner rows and columns of the briquettes B. Thus, the inner rows and columns of the briquettes B are delayed in the burning process, but after the delay period has expired, all the rows and columns of the briquettes B will reach the same heat producing capacity.

By virtue of this arrangement, the heat generated by the heat radiator 10 is generally constant over an extended and adequate cooking time period. The heat so generated for cooking has greater predictability and less variations during the cooking time period.

The size of the openings 93 formed in the top plate 91 of the cover 90, when the top plate 91 is not covered over entirely by a cooking utensil or the cooking utensil is spaced above the top plate 91, enables the more efficient burn off of hot gases emitted from the burning briquettes B. The openings 93 of the top plate 91 are of a dimension to partially trap or capture gas emitted from the briquettes B. The openings 93 of the top plate 91 of the cover 40 are dimensioned to impede the flow of gases emitted from the burning briquettes B from rising through the cover 90. While the briquettes B are burning, the top plate 91 becomes heated and burns off the captured gas below the top plate 91.

The cover 90, when the top plate 91 is not covered over entirely by a cooking utensil or the cooking utensil is spaced above the top plate 91, reduces flame flare-up caused by grease or fat from the food dripping onto the burning briquettes B. By virtue of the dimension of the openings 93 formed in the top plate 91 and the arrangement of the openings 93 in the top plate 91, the oxygen of the atmospheric air within the cover 90 is burned more efficiently. The grease or fat from the food dripping onto the briquettes B requires the oxygen of the atmospheric air in order to burn. The efficient consumption of the oxygen of the atmospheric air within the cover 90 reduces flare-up of grease or fat from food dripping onto the burning briquettes B.

The base 71 is waterproof to enable the accumulation of water to facilitate the extinguishing of burning briquettes B.

To ignite the briquettes B, conventional and well-known methods are employed. For example, solid fuel tablets, solid fuel sticks, alcohol gel, liquid lighter or the like are placed on the briquettes supported by the fire grate 85 before the cover 90 is placed on the collar 75. After the cover 90 is placed on the collar 75, matches or the like are dropped through an opening 95a formed in the top plate 91 of the cover 90. In the exemplary embodiment, the opening 95a is one square inch.

Figure 12:
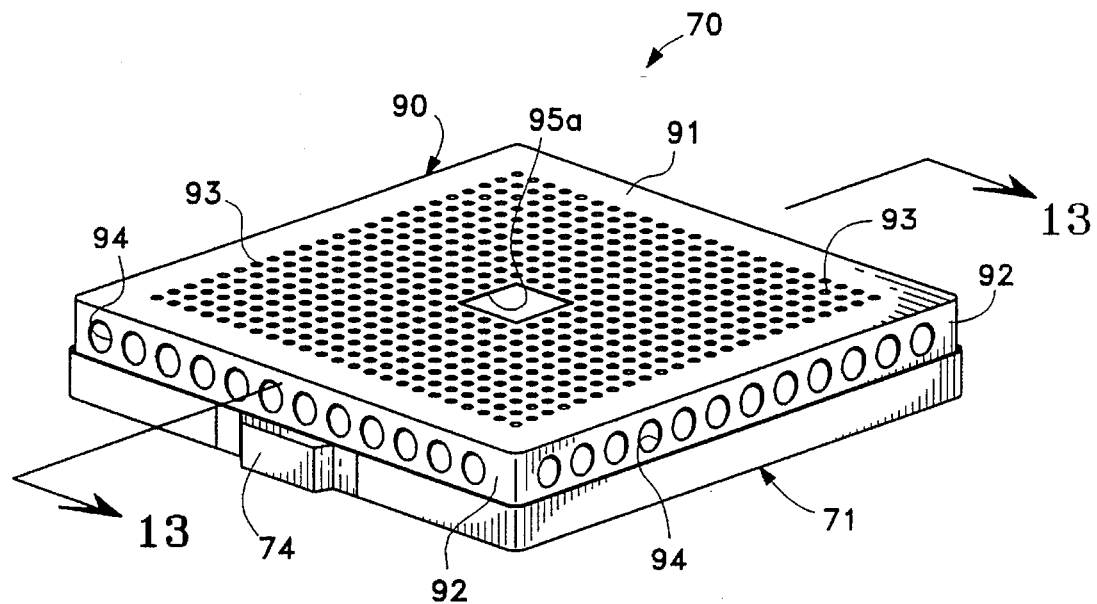
FIG. 12 is a perspective view of the heat radiator shown in FIGS. 9 and 10 arranged in a compact mode for transporting and storage.
Figure 13:
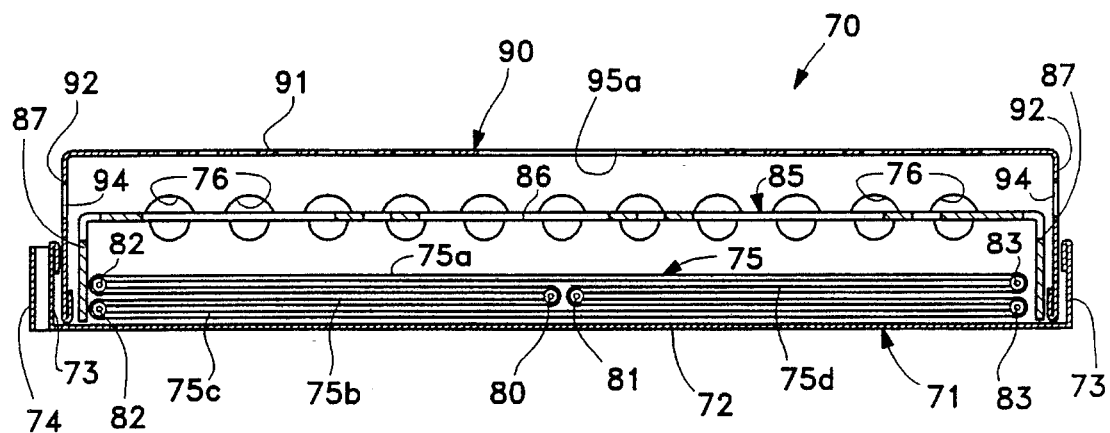
FIG. 13 is a vertical cross-sectional view of the heat radiator shown in FIG. 12 taken along line 13—13 of FIG. 12.

In FIGS. 12 and 13, the heat radiator 70 is depicted in a compact state for transporting and for storage. During the transport and storage mode, the support collar 75 is collapsed. The foldable panels 75b and 75d are folded between the confronting, outboard panels 75a and 75c. The folded panels 75b and 75d confront one another in substantial alignment intermediate the confronting outboard panels 75a and 75c. Prior to the folding of the foldable panels 75b and 75d, the fire grate 85 is removed.

The collapsed support collar 75 is placed within the base 71 and, either the outboard panel 75a or the outboard panel 75c is placed in engagement with the bottom wall 72 of the base 71. The fire grate 85 is placed within the base 71 over the support collar 75 with its depending walls 92 engaging the bottom wall 72 of the base 21. The cover 90 is disposed over the fire grate 85 within the base 71 with its depending walls 92 engaging the bottom wall 72 of the base 71. Now, the heat radiator 70 is in a compact state for transporting and for storage. It is apparent that a suitable strap can be wrapped around the heat radiator 70, while it is in a compact state, to hold the components together for transporting and storage. The strap, not shown, can be inserted in the space defined by the hook 74.

Figure 14:
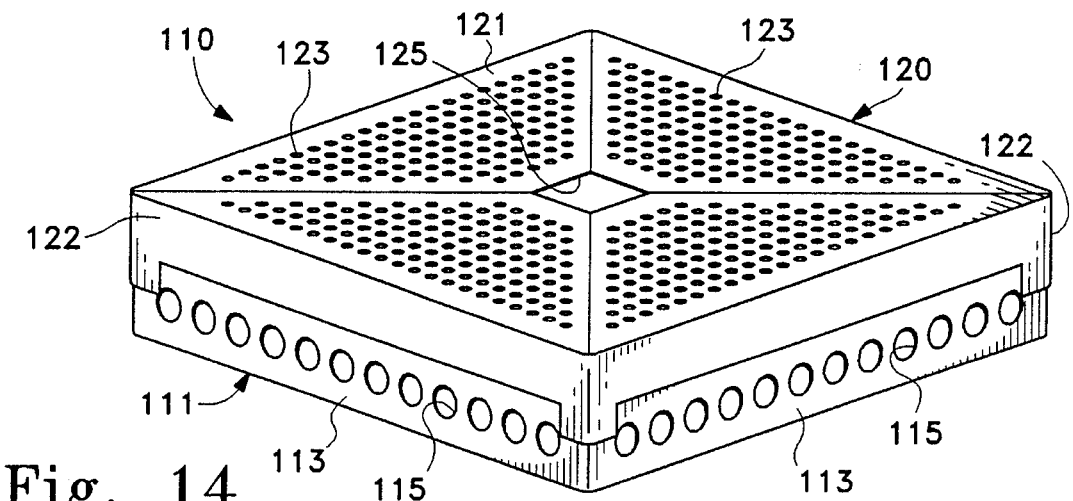
FIG. 14 is a perspective view of a modification of the heat radiator shown in FIGS. 9–13.
Figure 15:
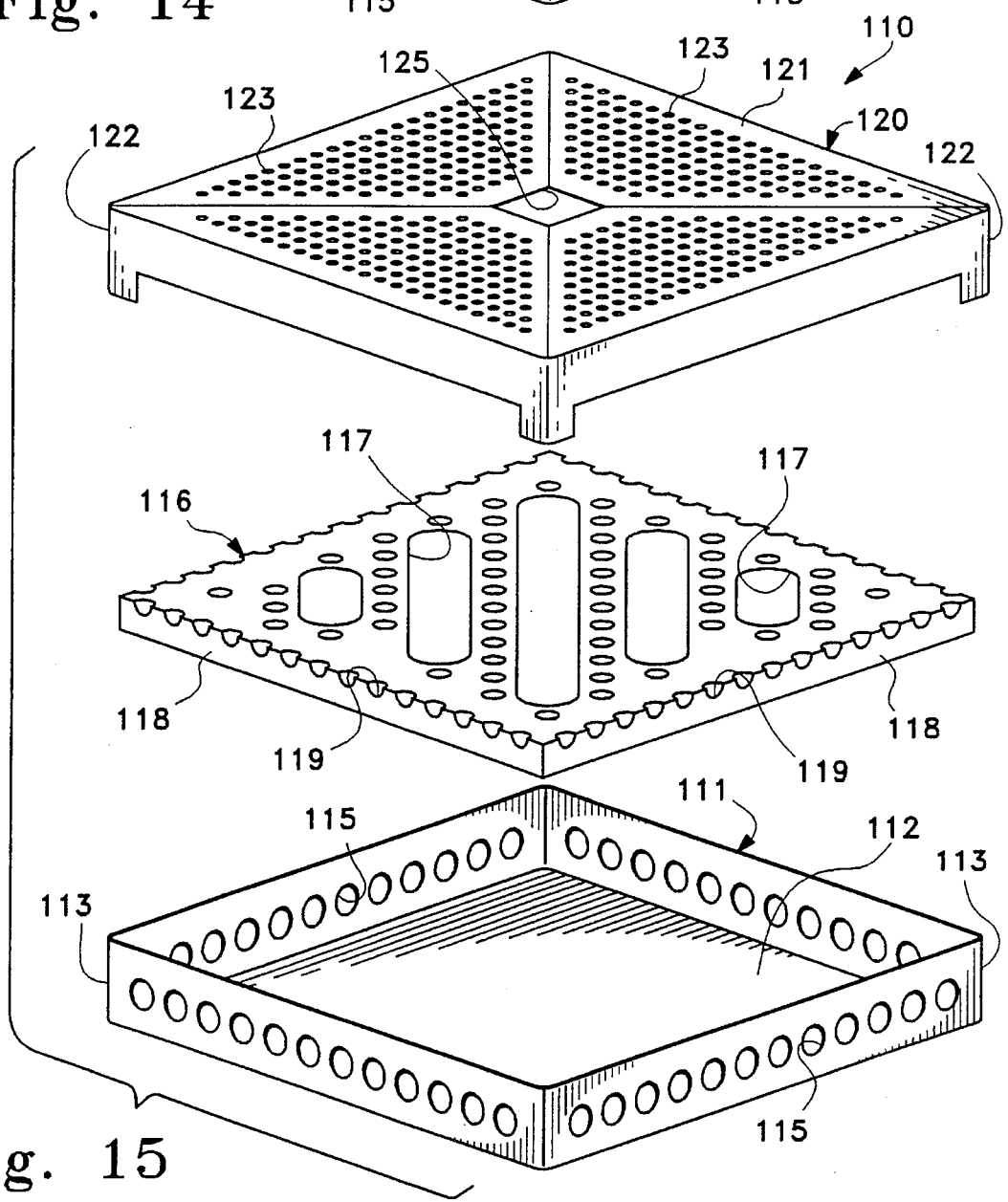
FIG. 15 is an exploded view of the heat radiator shown in FIGS. 11–13.

Illustrated in FIGS. 14 and 15 is a heat radiator 110, which is a modification of the heat radiator 70 shown in FIGS. 9–13. The heat radiator 110 comprises a base 111 made of suitable material such as stainless steel or iron. The base 111 has a bottom wall 112. In the exemplary embodiment, the bottom wall 112 has a quadrilateral configuration. The base 111 also includes upstanding walls 113 disposed along the perimeter of the bottom wall 112. Formed within the upstanding walls 113 are combustion air openings 115 through which combustion air enters the heat radiator 110.

A fire grate 116 is formed with parallel, slotted openings 117 which receive fuel elements, such as briquettes. The slotted openings 117 are configured to receive the narrowed dimensional sections of briquettes. The walls surrounding the slotted openings 117 support the briquettes in vertical orientation with the narrowed dimensional sections of the briquettes extending upwardly. The slotted openings 117 receive an end section or a side section of the briquettes. The fire grate 116 also comprises depending walls 118 which seat on the bottom wall 112 within the upstanding walls 113 and the base 110. The fire grate 116, which is made of suitable material, such as iron or stainless steel, has a quadrilateral configuration.

Formed within the depending walls 118 of the fire grate 116 are combustion air openings 119 through which combustion air enters the heat radiator 110. The combustion air openings 119 of the fire grate 116 are in register with the combustion air openings 115 of the base 111 when the fire grate 116 is seated on the base 111. A generally flat, horizontal cover 120 seats on the base 111 in overlying relation to the fire grate 116 and surrounds the fire grate 116. The cover 120 includes top plate 121 and depending walls 122. At the corner of the depending walls 122 are extensions which embrace the corners of the upstanding walls 113 of the base 111 in overlying relation. The cover 120 overlaps the base 111. The cover 120 is made of suitable material, such as highly tempered stainless steel, iron or titanium. In the exemplary embodiment, the cover 120 has a quadrilateral configuration. The cover 120 is sufficiently rigid and strong to support cooking utensils and other components of an outdoor cooking unit.

In the exemplary embodiment, the top plate 121 is formed with openings 123 disposed in parallel rows and columns. The dimensions of the openings 123 should be large enough so as not to fill-up with grease and should be small enough to inhibit too rapid burning of the briquettes B. In the preferred embodiment, each of the openings 123 has a relatively small diameter, i.e. the range of 3/16th of an inch to 1/4th of an inch. The top plate 121 is creased by bends from the corners of the cover 120 toward the center of the top plate 121 so that the top plate 121 can expand upwardly.

The heat radiator 110 is constructed and arranged to control the rate of combustion of the briquettes B. Combustion air enters the heat radiator 110 through the combustion air openings 115 of the base 111 and the combustion air openings 119 of the fire grate 116. This action causes the outer rows and columns of the briquettes B on the fire grate 116 to initially burn more readily than the inner rows and columns of the briquettes B on the fire grate 116. Initially, the inner rows and columns of the briquettes B on the fire grate 116 are cooler than the outer rows and columns of the briquettes B. As the outer rows and columns of the briquettes B burn down, more combustion air reaches the inner rows and columns of the briquettes B. Thus, the inner rows and columns of the briquettes B are delayed in the burning process, but after the delay period has expired, all the rows and columns of the briquettes B will reach the same heat producing capacity.

By virtue of this arrangement, the heat generated by the heat radiator 110 is generally constant over an extended and adequate cooking time period. The heat so generated for cooking has greater predictability and less variations during the cooking time period.

The cover 120 enables the more efficient burn off of hot gases emitted from the burning briquettes B by virtue of the size of the openings 123. The openings 123 of the top plate 121 of the cover 120 are dimensioned to impede the flow of gas emitted from the burning briquettes B from rising through the cover 120. The openings of the top plate 121 are of a dimension to partially trap or capture gas emitted from the briquettes B. While the briquettes B are burning the top plate 121 becomes heated and burns off the captured gas below the top plate 121.

The cover 120 reduces flame flare-up caused by grease or fat from the food dripping onto the burning briquettes B. By virtue of the dimensions of the openings 123 formed in the top plate 121, the oxygen of the atmospheric air within the cover 120 is burned more efficiently. The grease or fat from the food dripping onto the briquettes B requires the oxygen of the atmospheric air in order to burn. The efficient consumption of the oxygen of the atmospheric air within the cover 120 reduces flare-up of grease or fat from food dripping onto the burning briquettes B.

To ignite the briquettes B, conventional and well-known methods are employed. For example, solid fuel tablets, solid fuel sticks, alcohol gel, liquid lighter or the like are placed on the briquettes supported by the fire grate 116 before the cover 120 is placed on the base 111. After the cover 120 is placed on the base 111, matches or the like are dropped through opening 125 formed in the top plate 121. In the exemplary embodiment, the opening 125 is one square inch.

Figure 16:
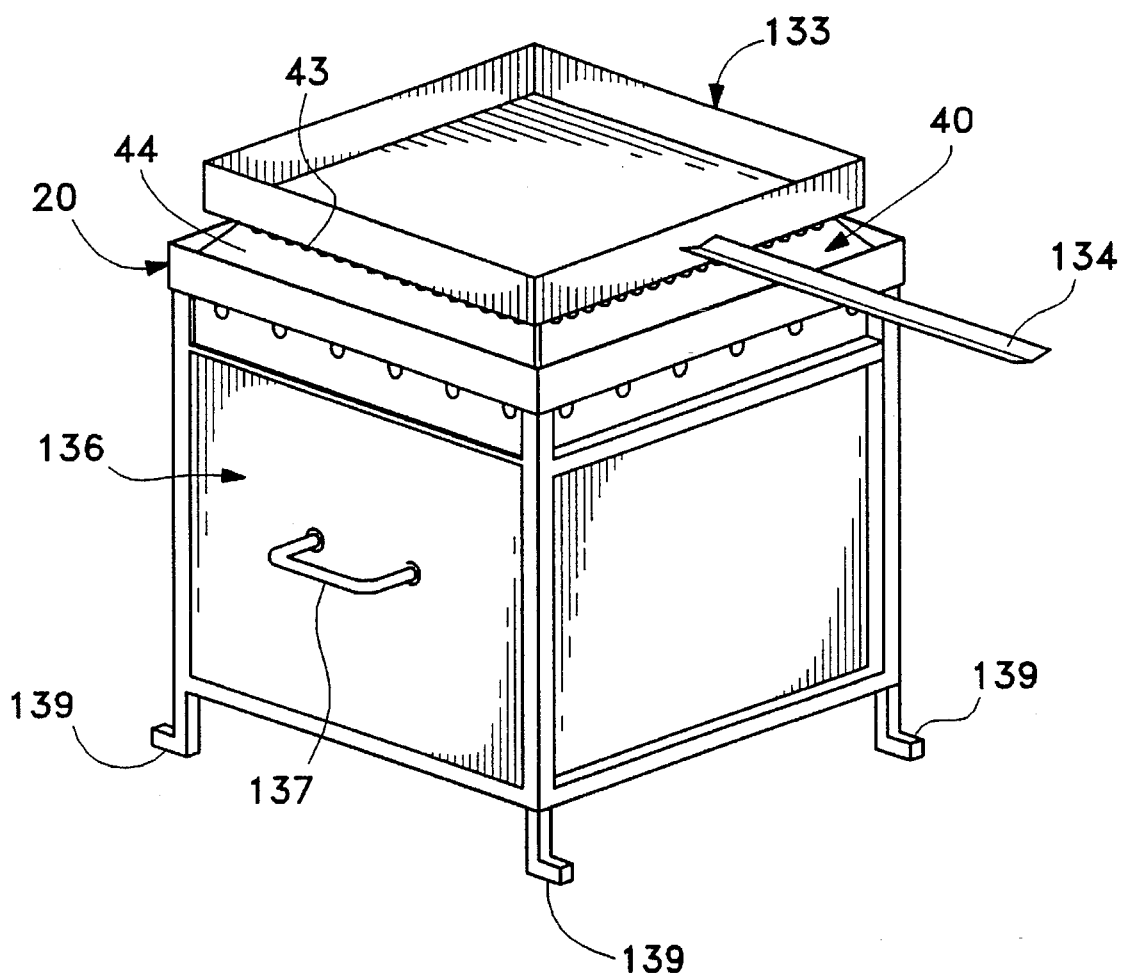
FIG. 16 is a diagrammatic perspective view of an outdoor cooking unit embodying a heat radiator of the present invention and illustrating the heat radiator arranged to heat food disposed thereabove and therebelow.

Illustrated in FIG. 16 is an outdoor cooking unit 130 employing the heat radiator 20. While the heat radiator 20 is depicted in FIG. 16, it is to be understood that the heat radiator 70 or the heat radiator 110 can be used equally as well. The outdoor cooking unit 130 comprises a heat radiator embodying the present invention, such as the heat radiator 20. Seated on the top plate 41 of the cover 40 incorporated in the heat radiator 20 is a suitable cooking utensil, such as a conventional cooking pot 131. While the exemplary embodiment of the cooking pot 131 is shown as being cubical, it is apparent that the cooking pot 131 may have a cylindrical configuration. A suitable handle 134 is provided for the cooking pot 131. Seated on the cooking pot 131 in overlapping arrangement is a suitable pan 133 that also functions as a lid for the cooking pot 131. Thus, the heat radiator 20 is employed to cook food disposed above the heat radiator 20. The heat radiator 20 seats on a suitable metal frame 135. Supported by the metal frame 135 below the heat radiator 20 is a suitable metallic oven 136. A suitable handle 137 is attached to the oven 136 for withdrawing the oven 136 from the frame 135 and inserting the oven 136 into the frame 135 in the horizontal direction. The frame 135 is supported by legs 139. Thus, the heat radiator 20 is also employed to cook food disposed below the heat radiator 20.

Figure 17:
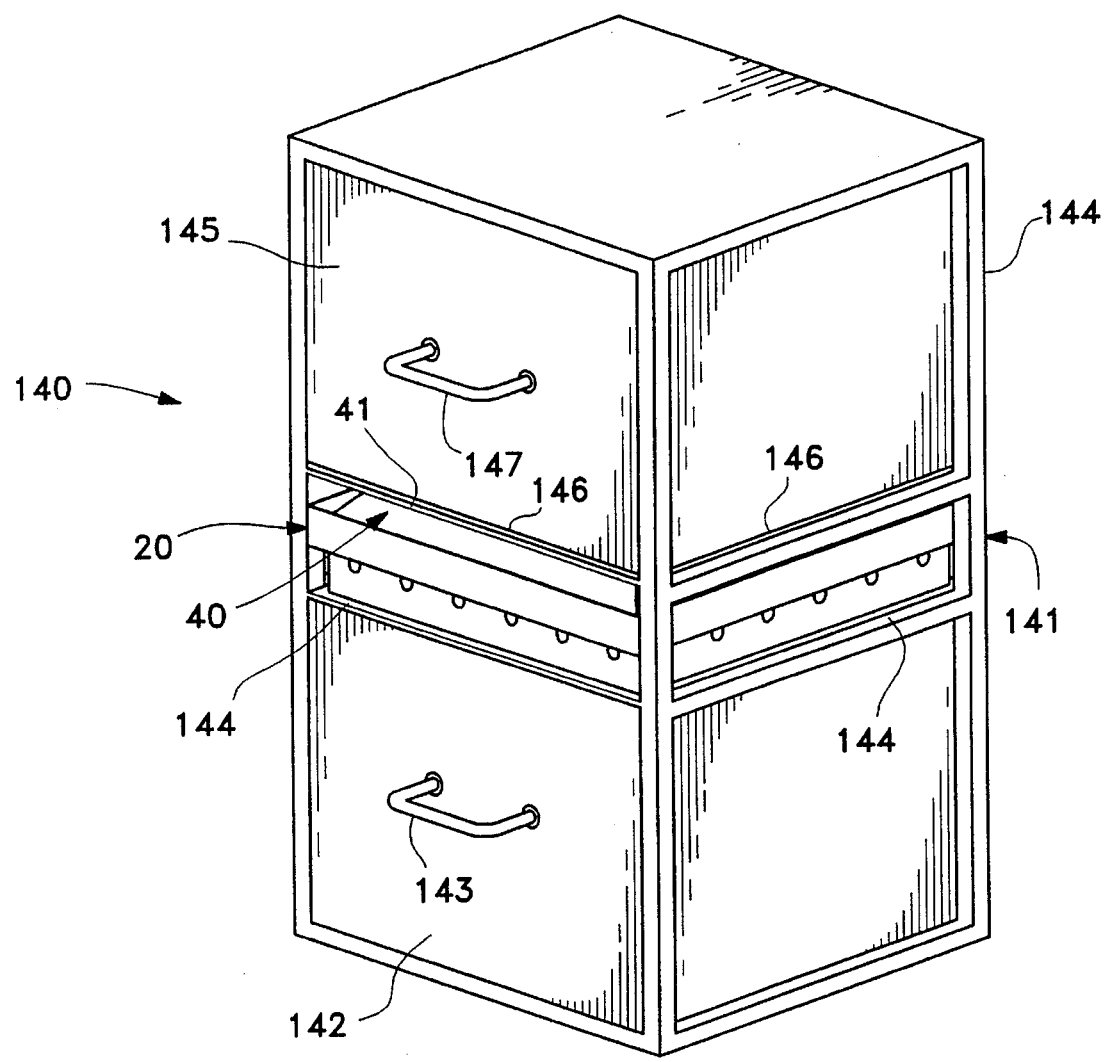
FIG. 17 is a diagrammatic perspective view of an outdoor cooking unit embodying a heat radiator of the present invention and illustrating the heat radiator arranged to heat food disposed below the heat radiator and to cook food disposed above the heat radiator.

Illustrated in FIG. 17 is an outdoor cooking unit 140 employing the heat radiator 20. While the heat radiator 20 is depicted in FIG. 17, it is to be understood that the heat radiator 70 or the heat radiator 110 can be used equally as well. The heat radiator 20 is disposed within a suitable metallic frame 141. Received by the metallic frame 141 at the lower section thereof is a suitable cooking utensil, such as an oven 142 with a suitable handle 143. The oven 142 is insertable in and removable from the frame 101 in a horizontal direction. The oven 142 is generally cubical. Thus, the heat radiator 20 is adaptable for heating the oven 142 disposed therebelow.

Fixed to the support frame 141 by suitable means, such as welding, above the oven 142 is a support plate 144. The heat radiator 20 seats on the support plate 144. Received by the frame 141 and positioned above and spaced from the heat radiator 20 is a suitable cooking utensil, such as an oven 145. The oven 145 seats on a support plate 146 in spaced relation to the top plate of the heat radiator 20. A suitable handle 147 is attached to the oven 145. The oven 145 is generally cubical. Thus, the heat radiator 20 is adaptable for heating the oven 145 disposed thereabove and the oven 142 disposed therebelow.

Figure 18:
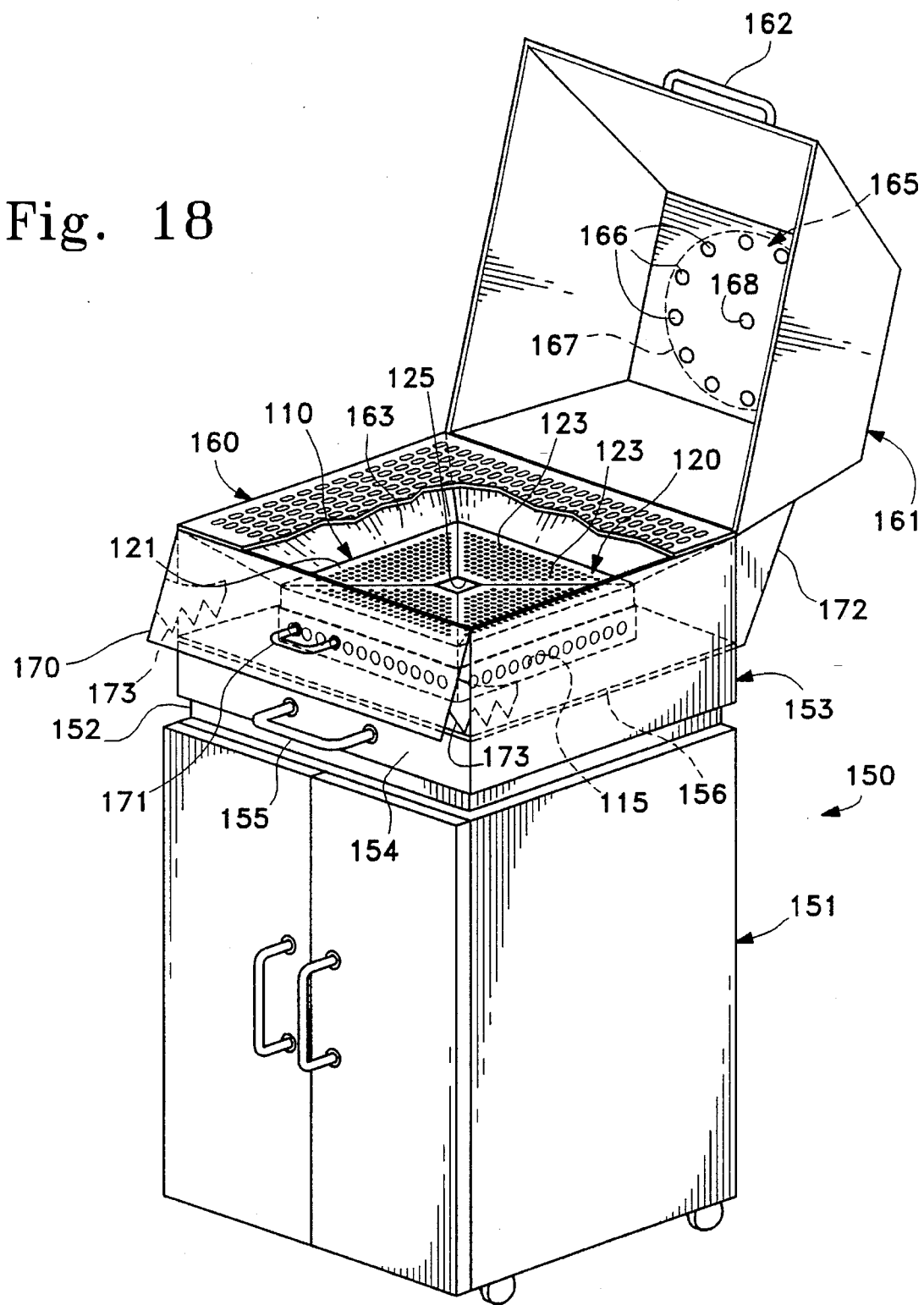
FIG. 18 is a fragmentary diagrammatic perspective view of a cabinet-type outdoor cooking unit embodying a heat radiator of the present invention and illustrating the heat radiator arranged to heat food disposed below the heat radiator and for cooking food disposed above the heat radiator.

Illustrated in FIG. 18 is an outdoor cooking unit 150. The outdoor cooking unit 150 comprises a suitable metal cabinet 151. On top of the cabinet 151 is a suitable perimetric, metallic spacer member 152. The spacer member 152 defines an air space, which functions as a heat insulator to protect the contents of the cabinet 151. Seated on the spacer member 152 is a metal frame 153. The spacer member 152 is fixed to the top of the cabinet 151. Disposed within the frame 153 and seated on the spacer member 152 is a suitable cooking utensil, such as an oven 154. A suitable handle 155 is attached to the front panel of the oven 154. The oven 154 is inserted into and removed from the frame 153 in a horizontal direction. A support plate 156 is secured to the frame 153 by suitable means, such as welding, above the oven 145. The support plate 156 is disposed adjacent the top of the oven 154, when the oven 154 is disposed within the frame 153.

Seated on the support plate 156 within the frame 153 is a heat radiator embodying the present invention, such as the heat radiator 110. While the heat radiator 110 is depicted in FIG. 18, it is to be understood that the heat radiator 20 or the heat radiator 70 can be used equally as well. Mounted on the frame 153 above and adjacent to the top plate 121 of the heat radiator 110 is a cooking grill 160. Pivotally attached to the top of the frame 153 is a suitable metallic hood 161. A suitable handle 162 is attached to the hood 161. Attached to the top plate 121 of the cover 120 and extending upwardly therefrom for attachment to the frame 153 adjacent the perimeter of the grill 160 is a truncated, pyramidal drip collar 163. The drip collar 163 is made of suitable material, such as stainless steel or sheet metal.

A suitable damper 165 is disposed on the hood 161. Toward this end, openings 166 are formed in the hood 161, which form a circular configuration. Contiguous to the upper surface of the hood 161 above the openings 166 is a plate 167 having a disc shape. The disc plate 167 has openings formed therein disposed in a circular configuration and adapted to register with the openings 166 formed in the hood 161. A suitable rivet 168 maintains the disc plate 167 contiguous to the upper surface of the hood 161, while enabling the disc plate 167 to be rotated. A suitable handle, not shown, facilitates the rotation of the disc plate 167. Thus, rotating the disc plate 167 for the openings thereof to register with the openings 166 of the hood 161 opens the damper 165. Rotating the disc plate 167 for the openings thereof to be angularly displaced from the openings 166 of the hood 161 closes the damper 165.

A damper door 170 is pivotally attached at its upper side to the top edge of the frame 153 by suitable hinges. A handle 171 is attached to the damper door 170. By lifting the damper door 170 upwardly, atmospheric air flows toward the heat radiator 110. Lowering the damper door 170 closes the damper door 170. A ratchet 173 is attached to each end of the damper door 170 for the teeth thereof to engage the teeth of an adjacent ratchet of an adjacent upright wall of the frame 153 to select the extent the damper door 170 is opened. The damper door 170 is made of a suitable flexible material such as an aluminum sheet. When the damper door 170 is fully closed. and it is desired to unlatch the same to open the damper door 170, a suitable lever, such as a screw driver or knife, temporarily bends the lower corners of the damper door 170 to separate the engaging ratchet teeth to pivot the damper door 170 upwardly to a selected angular position. Attached to the frame 153 below the edge of the frame 153 to which the hood 161 is pivotally attached is asuitable stop 172 for limiting the extent that the hood 161 may fall back against the frame 153. The stop 172 extends along the frame 153 the distance of the rear wall of the frame 153. The stop 172 is made of a suitable rigid metal and has a triangular configuration with the wider horizontal leg thereof adapted to engage the hood 161.

What is claimed is:

1. A heat radiator for an outdoor cooking unit heated by fuel elements, said heat radiator comprising:

(a) a base having a bottom wall and first upstanding walls projecting upwardly from said bottom wall, said first upstanding walls being formed with a plurality of combustion air openings;

(b) a fire grate disposed within said base and positioned above the combustion air openings formed in said first upstanding walls of said base, said fire grate being formed with openings adapted to support burning fuel elements; and (c) a cover supported by said base and disposed above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate.

2. A heat radiator as claimed in claim 1 wherein each of said openings formed in said top plate of said cover has a diameter in a range of three-sixteenth of an inch and one-fourth of an inch.

3. A heat radiator for an outdoor cooking unit heated by fuel elements, said heat radiator comprising:

(a) a base having a bottom wall and first upstanding walls projecting upwardly from said bottom wall, said first upstanding walls being formed with a plurality of combustion air openings;

(b) a fire grate disposed within said base and positioned above the combustion air openings formed in said first upstanding walls of said base, said fire grate being formed with openings adapted to support burning fuel elements; and (c) a cover supported by said base and disposed above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate;

(d) said base having second upstanding walls spaced outwardly from said first upstanding walls of said base to form flanges for said base, said second upstanding walls of said base projecting upwardly from said flanges, said fire grate being arranged to seat on said flanges, said cover being arranged to seat on said flanges.

4. A heat radiator as claimed in claim 1 wherein said fire grate is formed with openings for receiving, respectively, fuel elements, said openings formed in said fire grate being arranged in parallel rows and columns.

5. A heat radiator as claimed in claim 4 wherein each of said openings formed in said fire grate for receiving, respectively, fuel elements has a surrounding wall with quadrilateral configuration for supporting an associated fuel element.

6. A heat radiator for an outdoor cooking unit heated by fuel elements, said heat radiator comprising:

(a) a base having a bottom wall and first upstanding walls projecting upwardly from said bottom wall, said first upstanding walls being formed with a plurality of combustion air openings;

(b) a fire grate disposed within said base and positioned above the combustion air openings formed in said first upstanding walls of said base, said fire grate being formed with openings adapted to support burning fuel elements;

(c) a cover supported by said base and disposed above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate; and (d) a fuel element alignment and combustion air circulation plate disposed in said base and seated above said bottom wall of said base, said fuel element alignment and combustion air circulation plate being formed with openings for receiving fuel elements, respectively, said openings formed in said fuel element alignment and combustion air circulation plate being arranged in parallel rows and columns to register with the openings formed in said fire grate for improving the rate and intensity at which heat is emitted from said heat radiator.

7. A heat radiator as claimed in claim 1 wherein said base is waterproof for the accumulation of water to extinguish the fuel elements supported by said fire grate.

8. A heat radiator for an outdoor cooking unit heated by fuel elements, said heat radiator comprising:

(a) a base having a bottom wall and first upstanding walls projecting upwardly from said bottom wall, said first upstanding walls being formed with a plurality of combustion air openings;

(b) a fire grate disposed within said base and positioned above the combustion air openings formed in said first upstanding walls of said base, said fire grate being formed with openings adapted to support burning fuel elements;

(c) a cover supported by said base and disposed above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate, (d) a fuel element holder on which said fuel elements are initially placed, said fuel element holder with fuel elements thereon being adapted to be disposed on said fire grate for simultaneously disposing said fuel elements on said fire grate.

9. A heat radiator as claimed in claim 8 wherein said fuel element holder is combustible.

10. A heat radiator as claimed in claim 8 wherein said fuel element holder is formed with openings to receive said fuel elements, said openings of said fuel element holder being in registry with said openings of said fire grate.

11. A heat radiator for an outdoor cooking unit heated by fuel elements, said heat radiator comprising:

(a) a base having a bottom wall and first upstanding walls projecting upwardly from said bottom wall, said first upstanding walls being formed with a plurality of combustion air openings;

(b) a fire grate disposed within said base and positioned above the combustion air openings formed in said first upstanding walls of said base, said fire grate being formed with openings adapted to support burning fuel elements;

(c) a cover supported by said base and disposed above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate, (d) said fire grate being formed with openings for receiving, respectively, fuel elements, said openings formed in said fire grate being arranged in parallel rows and columns; and (e) a fuel element holder on which said fuel elements are initially placed, said fuel element holder with said fuel elements thereon being adapted to be disposed on said fire grate for simultaneously disposing said fuel elements on said fire grate, said fuel element holder being formed with openings for receiving, respectively, said fuel elements, said openings of said fuel element holder being in registry, respectively, with said openings of said fire grate.

12. A heat radiator as claimed in claim 11 wherein said fuel element holder is combustible.

13. A heat radiator for an outdoor cooking unit comprising:

(a) a base;

(b) a support collar disposed on said base, said support collar being formed with a plurality of combustion air openings;

(c) a fire grate disposed on said base within said support collar, said fire grate being adapted to support burning fuel elements; and (d) a cover seated on said support collar above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate, (e) said support collar having a flat, generally vertical wall, said combustion air openings being formed in said flat, generally vertical wall enabling a flow of combustion air across said fuel elements on said fire grate to provide a generally constant heat over an extended period of time.

14. A heat radiator as claimed in claim 13 wherein each of said openings formed in said top plate of said cover has a diameter in the range of three-sixteenth of an inch and one-fourth of an inch.

15. A heat radiator as claimed in claim 13 wherein said support collar has hinged panels for folding said support collar into a compact state.

16. A heat radiator as claimed in claim 13 wherein said base is formed with upstanding walls along the perimeter thereof, said combustion air openings formed in said support collar being disposed above the upstanding walls of said base.

17. A heat radiator for an outdoor cooking unit comprising:

(a) a base;

(b) a fire grate disposed on said base, said fire grate having depending walls along the perimeter thereof, said depending walls of said fire grate being formed with combustion air openings; and (c) a cover seated on said base above said fire grate, said cover having a generally flat, horizontal top plate formed with a plurality of openings for hot air to flow from said heat radiator, said openings formed in said top plate of said cover are sufficiently large to inhibit the accumulation of foreign material therein and sufficiently small to inhibit the rapid burning of fuel elements on said fire grate.

18. A heat radiator as claimed in claim 17 wherein each of said openings formed in said top plate of said cover has a diameter in the range of three-sixteen of an inch and one-fourth of an inch.

19. A heat radiator for an outdoor cooking unit comprising:

(a) a base;

(b) a fire grate disposed on said base, said fire grate being adapted to support burning fuel elements; and (c) a member supported by said base, said member having a flat, generally vertical wall, combustion air openings formed in said wall enabling a flow of combustion air across said fuel elements to provide a generally constant heat over an extended period of time.

20. A heat radiator as claimed in claim 19 and comprising a cover, said cover having a generally flat, horizontal top plate disposed above said member and formed with a plurality of openings for hot air to flow from said heater radiator, said openings formed in said top plate of said cover are sufficiently large to inhibit the accumulation of foreign material therein and sufficiently small to inhibit the rapid burning of fuel elements on said fire grate.

* * * * *